United States Patent
Perez

(10) Patent No.: US 8,005,370 B2
(45) Date of Patent: Aug. 23, 2011

(54) REFERENCE CLOCK RATE DETECTION FOR VARIABLE RATE TRANSCEIVER MODULES

(75) Inventor: Ronald Edward Perez, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 517 days.

(21) Appl. No.: 12/332,233

(22) Filed: Dec. 10, 2008

(65) Prior Publication Data

US 2010/0142967 A1 Jun. 10, 2010

(51) Int. Cl.
*H04B 10/00* (2006.01)

(52) U.S. Cl. .......................... 398/155; 398/173; 398/135

(58) Field of Classification Search .................. 398/154, 398/155, 135, 173
See application file for complete search history.

(56) References Cited

U.S. PATENT DOCUMENTS

| | | | | |
|---|---|---|---|---|
| 5,483,180 | A * | 1/1996 | Chai et al. | 326/93 |
| 5,838,749 | A * | 11/1998 | Casper et al. | 375/376 |
| 5,864,416 | A * | 1/1999 | Williams | 398/202 |
| 5,963,608 | A * | 10/1999 | Casper et al. | 375/373 |
| 6,438,188 | B1 * | 8/2002 | Streett | 375/376 |
| 6,606,365 | B1 * | 8/2003 | Chen | 375/376 |
| 6,650,720 | B1 * | 11/2003 | Grung et al. | 375/375 |
| 6,724,328 | B1 * | 4/2004 | Lui et al. | 341/101 |
| 6,917,762 | B2 * | 7/2005 | Kim | 398/158 |
| 6,931,210 | B2 * | 8/2005 | Kim et al. | 398/155 |
| 6,973,148 | B2 * | 12/2005 | Berens et al. | 375/362 |
| 7,020,401 | B2 * | 3/2006 | Sakano et al. | 398/175 |
| 7,039,327 | B2 * | 5/2006 | Kim et al. | 398/202 |
| 7,076,177 | B1 * | 7/2006 | Yang et al. | 398/208 |
| 7,130,543 | B2 * | 10/2006 | Cho et al. | 398/155 |
| 7,599,457 | B2 * | 10/2009 | Johnson et al. | 375/359 |
| 7,680,418 | B2 * | 3/2010 | Tsuji | 398/155 |
| 7,684,532 | B2 * | 3/2010 | Aung et al. | 375/355 |
| 7,702,058 | B2 * | 4/2010 | Margules | 375/376 |
| 7,738,602 | B2 * | 6/2010 | Langenbach et al. | 375/341 |
| 7,941,054 | B2 * | 5/2011 | Tsuji | 398/155 |
| 2001/0019441 | A1 * | 9/2001 | Kogure et al. | 359/158 |
| 2001/0038474 | A1 * | 11/2001 | Bradshaw et al. | 359/110 |
| 2002/0027695 | A1 * | 3/2002 | Kim et al. | 359/189 |
| 2002/0039211 | A1 * | 4/2002 | Shen et al. | 359/110 |
| 2003/0052709 | A1 * | 3/2003 | Venkata et al. | 326/37 |
| 2007/0230966 | A1 * | 10/2007 | Walsh | 398/155 |
| 2010/0142967 | A1 * | 6/2010 | Perez | 398/135 |

* cited by examiner

*Primary Examiner* — Agustin Bello
(74) *Attorney, Agent, or Firm* — Law Office of Gerald Maliszewski; Gerald Maliszewski

(57) ABSTRACT

A system and method are provided for determining an optical signal frequency range in an optical/electrical transceiver. The method receives an optical receive signal having a non-predetermined data rate via a network interface, and also receives an electrical reference clock signal having a non-predetermined frequency via a framer interface. The reference clock signal frequency is cross-referenced to an optical receive signal frequency. In one aspect a clock and data recovery (CDR) voltage controlled oscillator (VCO) is selected having an output frequency matching the cross-referenced optical receive signal frequency. The optical receive signal is converted to an electrical receive signal. Initially, the VCO is frequency-locked to the reference clock. Subsequent to frequency-locking the VCO output frequency, the converted optical signal is phase-locked, generating a receive data clock. The CDR supplies a converted optical receive signal and receive data clock to the framer interface.

17 Claims, 4 Drawing Sheets

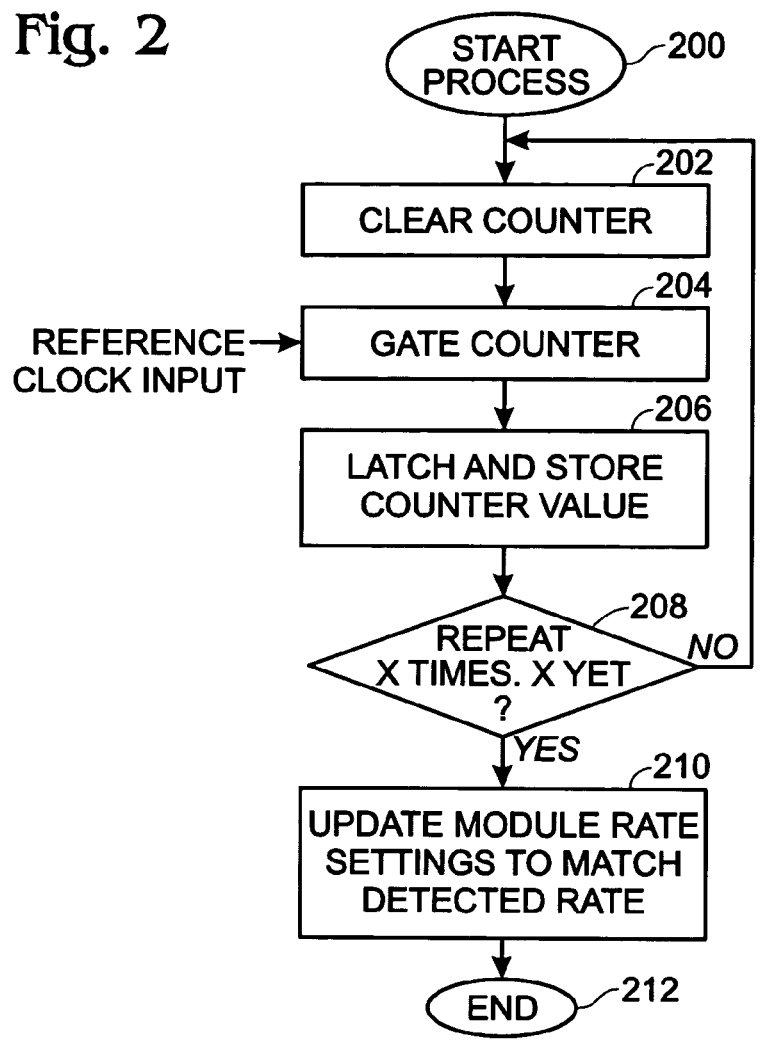
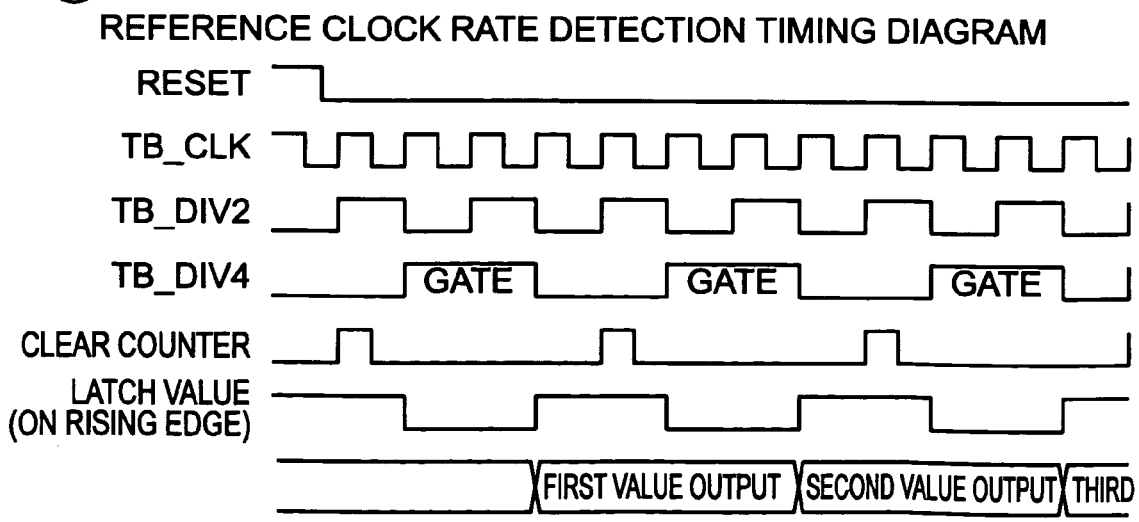

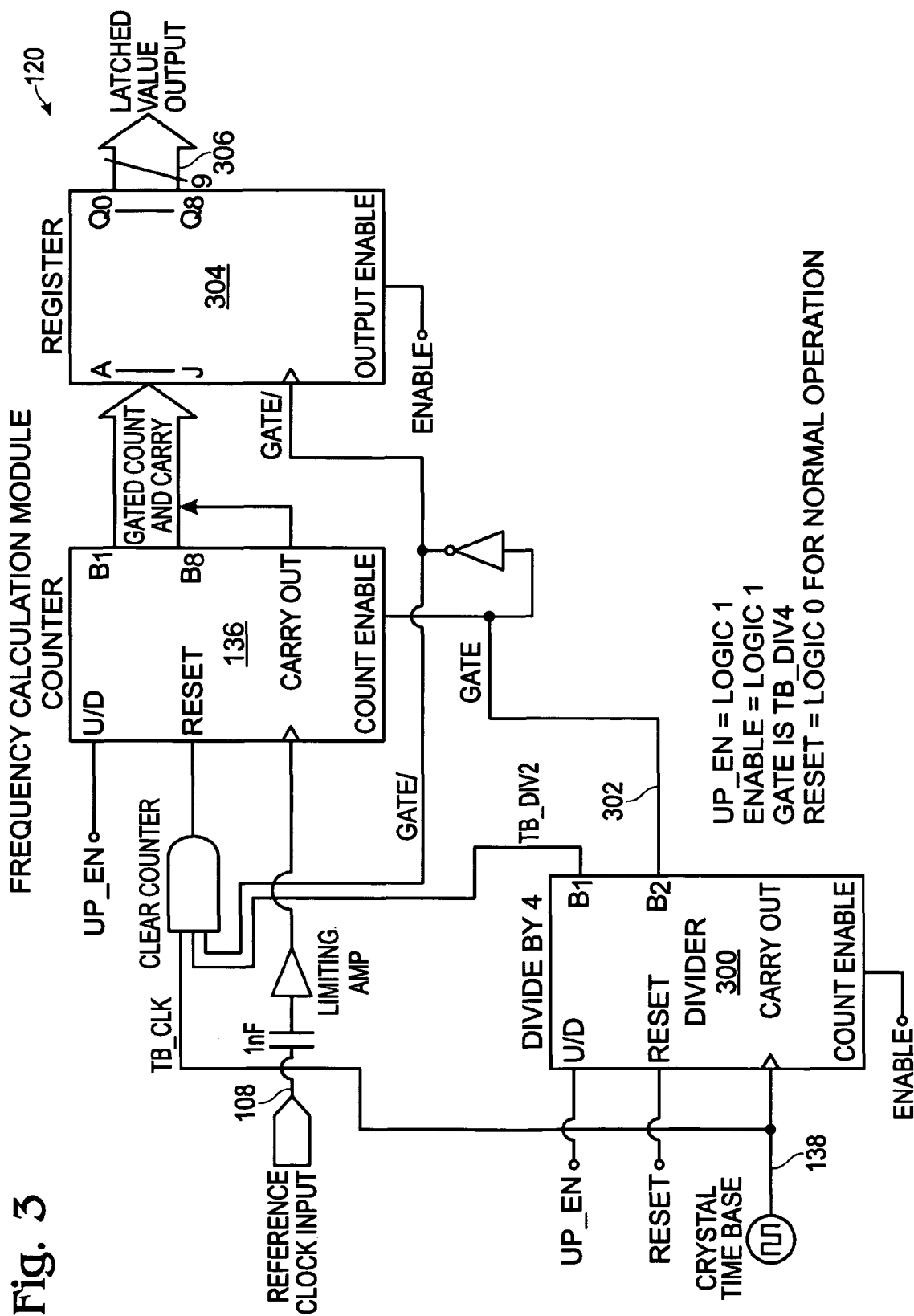

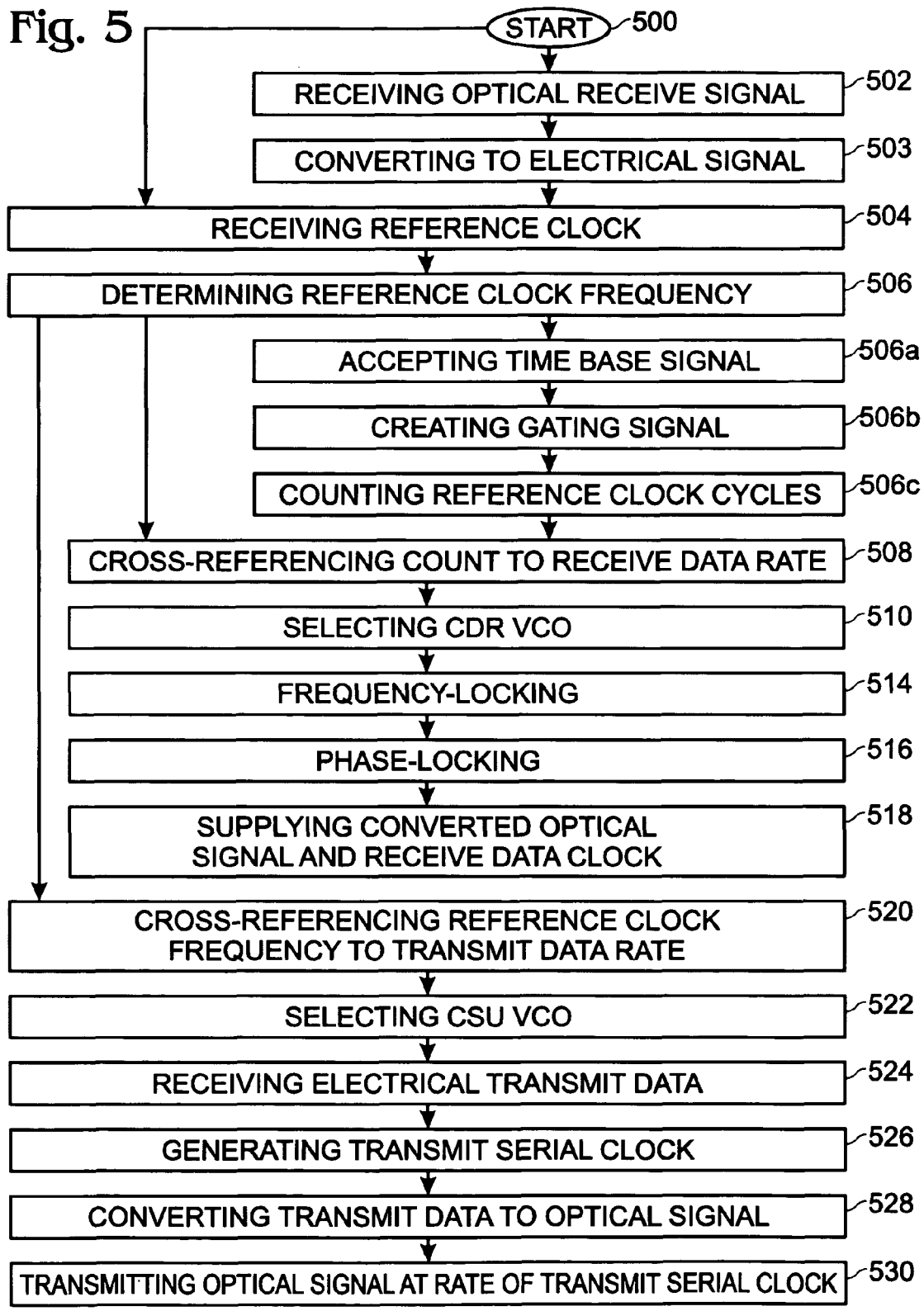

REFERENCE CLOCK RATE DETECTION FOR VARIABLE RATE TRANSCEIVER MODULES

BACKGROUND OF THE INVENTION

1. Field of the Invention

This invention generally relates to digital communications and, more particularly, to a system and method for clock rate detection in clock and data recovery (CDR) and clock synthesis units (CSUs).

2. Description of the Related Art

Conventionally, system platforms provide an optical transceiver module with a reference clock and data at the reference clock multiplied rate. These rates are a selection of more than half a dozen rates which continue to increase as technology moves forward. The module is required to operate at the given data rate without any system setup communication. If this setup communication protocol was provided and all modules and systems spoke this protocol, then data rate acquisition would be relatively easy. However, this is not the case, as modules and system platforms do not communicate, data rate information between each other.

Some prior art CDR and CSUs optical interface data rates must be set manually, or user-selected prior to being placed into a system platform that supplies a reference clock. One undesirable alternative is a system platform that provides a single data rate that is not standardized among all platform developers and module vendors. A second alternative is to use CDR and CSUs capable of generating their own reference clocks and acquiring a non-predetermined data rate. However, this capability would add to the cost and complexity of the units. A third alternative would be to use CDR and CSUs with a control signal port able to communicate with the system platform for the purpose of a data rate already predetermined by the system platform. However, as mentioned above, no protocol exists for communications between CDR/CSU transceiver and a system platform.

Alternately, a CDR or CSU may be used without a reference clock, but such units are likely to provide a poor level of performance. As another alternative, a wide band single VCO could be used that can be tuned to operate at any possible data rate, but again, the level of performance is likely to be poor.

It would be advantageous if a CDR or CSU could be made to operate at a non-predetermined data rate without the complexity of auto-frequency acquisition or special, system platform communications.

SUMMARY OF THE INVENTION

The disclosed invention performs reference clock detection and rate detection within communication port modules, which are referred to herein as transceivers. The invention provides a solution to enable a variable rate transceiver module to be operational in system platforms which have different data rates available. More explicitly, enabled transceiver modules are able to detect the system-supplied reference clock frequency. With this detection capability, the modules do not require special marking or pre-conditional programming at the factory for specific data rate configurations.

A single module type with multiple data rate capability does not have to be preset to function at a fixed rate port configuration. Such a module is pluggable in all port configurations of different data rates. Since the module determines the correct port data rate, port compatibility and seamless operation are provided, while eliminating human intervention for system configuration and hardware logistics.

Accordingly, a method is provided for determining an optical signal frequency range in an optical/electrical transceiver. The method receives an optical receive signal having a non-predetermined data rate via a network interface, and also receives an electrical reference clock signal having a non-predetermined frequency via a framer interface. The reference clock signal frequency is cross-referenced to an optical receive signal frequency.

In one aspect a clock and data recovery (CDR) voltage controlled oscillator (VCO) is selected having an output frequency matching the cross-referenced optical receive signal frequency. The optical receive signal is converted to an electrical receive signal. Initially, the VCO is frequency-locked to the reference clock. Subsequent to frequency-locking the VCO output frequency, the converted optical signal is phase-locked, generating a receive data clock. The CDR supplies a converted optical receive signal and receive data clock to the framer interface.

In another aspect, the determined reference clock signal frequency is cross-referenced to an optical transmit signal frequency. A clock synthesizer unit (CSU) VCO is selected having a non-predetermined output frequency matching the cross-referenced optical transmit signal frequency. In response to frequency-locking the CSU VCO output frequency to the reference clock signal, a transmit serial clock is generated. Electrical transmit data received via the framer interface is converted to an optical transmit signal and transmitted at the rate of the transmit serial clock.

Additional details of the above-described method, and a system for determining an optical signal frequency range in an optical/electrical transceiver, are provided below.

BRIEF DESCRIPTION OF THE DRAWINGS

FIG. 2 is a flowchart illustrating a reference clock rate detection algorithm for variable rate transceiver modules.

FIG. 3 is a schematic block diagram depicting in detail, an exemplary embodiment of a portion of the frequency calculation module of FIG. 1.

FIG. 4 is a timing diagram in support of the frequency calculation module of FIG. 3.

FIG. 5 is a flowchart illustrating a method for determining an optical signal frequency range in an optical/electrical transceiver.

DETAILED DESCRIPTION

Figure 1:
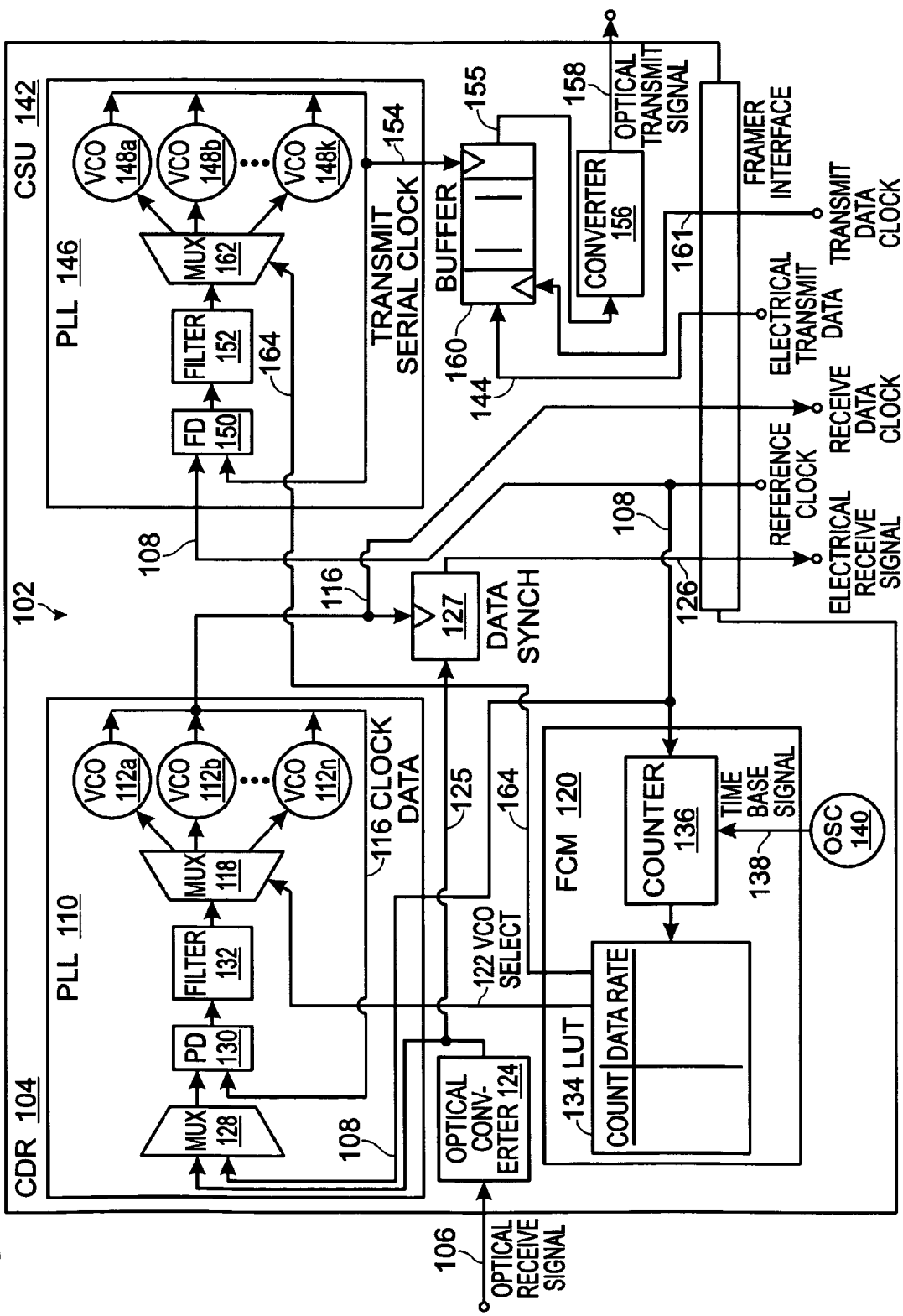
FIG. 1 is a schematic block diagram of an optical/electrical transceiver with a system for determining an optical signal frequency range.

FIG. 1 is a schematic block diagram of an optical/electrical transceiver 100 with a system for determining an optical signal frequency range. The system 102 comprises a clock data recovery (CDR) unit 104 having network interface on line 106 to accept an optical receive signal having a non-predetermined data rate. The CDR 104 also has a framer interface to accept an electrical reference clock signal on line 108 having a non-predetermined frequency. The CDR 104 further comprises a phase-locked loop (PLL) 110 including a selectable voltage controlled oscillator (VCO) 112 to supply an electrical receive data clock on line 116 via the framer interface. In one aspect, the CDR PLL 110 includes a plurality of VCOs with a corresponding plurality of unique output frequency ranges, selectively engagable in response to a VCO selection signal. Typically, the VCOs have overlapping output frequency ranges. VCOs 112a through 112n are shown, selectable through multiplexer (MUX) 118. Note: n is not limited to any particular value.

A frequency calculation module (FCM) 120 has an interface on line 108 to accept the reference clock signal via framer interface. The frequency calculation module 120 determines the reference clock signal frequency, cross-references the determined clock signal frequency to an optical receive signal frequency, and supplies a VCO selection signal to the CDR PLL on line 122.

In one aspect, as shown, the CDR unit 104 includes an optical converter 124 for converting the optical receive signal to an electrical signal on line 125. A data synchronizer (synch) 127 gates the electrical signal on line 125, using the receive data clock on line 116, to supply an electrical received signal via the framer interface on line 126. The PLL 110 initially frequency-locks to the reference clock signal using the selected VCO 112, and subsequently phase-locks to the electrical signal on line 125, generating the receive data clock on line 116. The switching between frequency-lock and phase-lock modes is represented using multiplexer 128. In other aspects not shown, different types of detectors may be used for the frequency and phase-locking functions. However, for simplicity only a single phase/frequency detector (PD) 130 is shown. Typically, a PLL also includes a loop filter 132.

More explicitly, the frequency calculation module 120 may be enabled with a look-up table (LUT) 134, a counter 136, and an interface on line 138 to accept a predetermined time base signal. For example, the time base signal may be generated by a crystal oscillator 140 embedded with the transceiver 100. The frequency calculation module 120 uses the time base signal to gate the counter 136 with a predetermined period, to count reference clock cycles in the period. Then, the reference clock cycle count can be cross-referenced to a frequency in the look-up table 134, and the VCO selection signal on line 122 is supplied in response to the look-up table frequency.

If the CDR unit 104 receives an updated reference clock signal on line 108, the frequency calculation module 120 determines an updated reference clock signal frequency, cross-references the determined updated clock signal frequency to an updated optical receive signal frequency, and supplies an update VCO selection signal on line 122.

The transceiver 100 may also be comprised of a clock synthesizer unit (CSU) 142 having a framer interface to accept electrical transmit data on line 144. The CSU 142 has a PLL 146 including a selectable VCO 148, frequency detector (FD) 150, and loop filter 152. The PLL 146 frequency-locks the VCO output frequency to the reference clock on line 108 and supplies a transmit serial clock on line 154. Note: in some aspects not shown, the transmit serial clock signal is divided before being presented to the FD 150. The transmit data on line 144 is buffered in buffer 160. The transmit data is gated into buffer 160 using the transmit data clock signal on line 161. The buffered data is provided on line 155 at the rate of the transmit serial clock on line 154. Note: in one aspect not shown, the electrical transmit data is receive as a parallel data stream. In this aspect, the output of the buffer, or the outputs of parallel buffers would be multiplexed into a stream of serial data prior to being converted into an optical signal. An electrical converter 156 converts the buffered transmit data on line 155 into an optical transmit signal transmitted on a network interface on line 158. The optical transmit signal on line 158 is supplied at the rate of the transmit serial clock on line 154. The frequency calculation module 120 supplies a VCO selection signal on line 164 to the CSU 142 in response to cross-referencing the determined reference clock signal frequency to an optical transmit signal frequency. The VCO selected is enabled through the use of MUX 162.

As in the CDR, the CSU PLL 146 includes a plurality of VCOs with a corresponding plurality of unique output frequency ranges, selectively engagable in response to the VCO selection signal. Typically, the VCOs have overlapping output frequency ranges. VCOs 148a through 148k are shown, selectable through multiplexer 162. Note: k is not limited to any particular value.

As shown, the transceiver 100 includes both a CDR and CSU. In other aspect not shown, the transceiver may be comprised of a receive CDR and a transmit CDR. Also note that the optical transmit data rates and optical receive data rates need not be the same, which would require different reference clock for each unit (not shown in FIG. 1 for simplicity). Although the systems are depicted as hardware modules, in some aspects subcomponents of the system may be enabled using software instructions stored in a memory, which are acted upon by a processor.

Functional Description

A communication platform typically has multiple ports (framer interfaces) which operate at different data rates (depending on a number of factors), such as, SONET, Ethernet, Fiber-channel, and forward error correction encoding applied to anyone of the standards mentioned above. The communication platform transmits and receives data through the transceiver or port module depicted in FIG. 1. The transceiver provides the optics to allow data transmission on fiber optic cables, for short or long reach applications. The transceiver determines the data rate from the system port by means of analyzing the reference clock provided by the system platform (the framer interface). After determining the reference clock rate, the transceiver "knows" the data rate for the port, and proceeds to configure the CDR or CSU with the proper settings for best performance at the given data rate.

The inputs to the transceiver are the reference clock provided by the system platform, and a precision time base (crystal oscillator) within the transceiver module. A divider, counter, and gating circuit are used to process the timing results. In one aspect not shown, a microcontroller within the transceiver, with software, aids in the process. The result is statistical data which provides the reference clock operating frequency rate.

The transceiver depicted in FIG. 1 enables a variable rate transceiver module to be operational in system platforms which have different data rates. The transceiver is able to operate at the required data rate without any system setup communication. By detecting the system reference clock and the reference clock frequency, the transceiver operates at the required data rate, without pre-conditional programming at the factory for specific data rate configuration. Since the transceiver does not have to be preset to function at a fixed rate port configuration, the unit is pluggable into all of the port configurations of different data rates, eliminating human intervention for system configuration and hardware logistics.

FIG. 2 is a flowchart illustrating a reference clock rate detection algorithm for variable rate transceiver modules. The process starts at Step 200. In Step 202 the counter is cleared. In Step 204 the counter is gated, so that reference clock cycles can be counted within a predetermined period. In Step 206 the counter is latched and the counter value stored. Typically, a number of counts (e.g., X) may be taken. Step 208 determines if the number of iterations=X. In one aspect, X=5. If not, another counter iteration is performed. If the number of iterations=X, Step 210 updates the detected reference clock frequency calculation. The process ends at Step 212, but is reinitiated if the reference clock frequency changes.

FIG. 3 is a schematic block diagram depicting in detail, an exemplary embodiment of a portion of the frequency calculation module of FIG. 1.

FIG. 4 is a timing diagram in support of the frequency calculation module of FIG. 3. Referencing both FIGS. 3 and 4, the counter 136 accepts the reference clock signal on line 108. For example, the reference clock frequency may be in the range of 155 to 177 megahertz (MHz) or 622 to 709 MHz. Divider 300 divides the time base signal (TB_CLK) on line 138, for example a 10 MHz signal, by 4 (TB_DIV4), creating a gate signal on line 302. The gate signal enables counter 136. The count collected in the gate period is supplied to register 304. The count value latched in register 304 is supplied on line 306, and is cross-referenced to a data rate in a LUT (see FIG. 1).

FIG. 5 is a flowchart illustrating a method for determining an optical signal frequency range in an optical/electrical transceiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 receives an optical receive signal having a non-predetermined data rate via a network interface. Step 504 receives an electrical reference clock signal having a non-predetermined frequency via a framer interface. Step 506 determines the reference clock signal frequency. Step 508 cross-references the determined reference clock signal frequency to an optical receive signal frequency. If Step 504 receives an updated reference clock signal, then Step 506 determines an updated reference clock signal frequency. Step 508 cross-references the determined updated clock signal frequency to an updated optical receive signal frequency.

In one aspect, Step 503 converts the optical receive signal to an electrical receive signal. Step 510 selects a CDR VCO having an output frequency matching the cross-referenced optical receive signal frequency. Typically, a VCO is selected from a plurality of VCOs with a corresponding plurality of unique output frequency ranges. The plurality of VCOs may have overlapping output frequency ranges. Step 514 frequency-locks the VCO output frequency to the reference clock. Subsequent to frequency-locking the VCO output frequency, Step 516 phase-locks the converted optical receive signal, generating a receive data clock. Step 518 supplies the converted optical receive signal and receive data clock to the framer interface.

Determining the reference clock signal frequency may include the following substeps. Step 506a accepts a predetermined time base signal. Step 506b uses the time base signal to create a gating signal with a predetermined period. Step 506c counts reference clock cycles in the period.

In another aspect, Step 520 cross-references the determined reference clock signal frequency to an optical transmit signal frequency. Step 522 selects a CSU VCO having a non-predetermined output frequency matching the cross-referenced optical transmit signal frequency. Typically, the VCO is selected from a plurality of VCOs with a corresponding plurality of unique output frequency ranges. Step 524 receives electrical transmit data via the framer interface. In response to frequency-locking the CSU VCO output frequency to the reference clock signal, Step 526 generates a transmit serial clock. After Step 528 converts the transmit data to an optical transmit signal, Step 530 transmits the optical transmit signal via the network interface at the rate of the transmit serial clock.

Note: Steps 504 through 506 and 520 through 530 may be performed independent of, or without the performance of Steps 502 and Steps 510 through 518. Likewise, Steps 502 through 518 may be performed independent of, or without the performance of Steps 520 through 530.

A system and method has been provided for determining an optical signal frequency range in an optical/electrical transceiver. Examples of circuitry and process flows have been given to illustrate the invention. However, the invention is not necessarily limited to just those examples. Other variations and embodiments of the invention will occur to those skilled in the art.

I claim:

1. In an optical/electrical transceiver, a method for determining an optical signal frequency range, the method comprising:
   receiving an optical receive signal having a non-predetermined data rate via a network interface;
   receiving an electrical reference clock signal having a non-predetermined frequency via a framer interface;
   determining the reference clock signal frequency; and,
   cross-referencing the determined reference clock signal frequency to an optical receive signal frequency.

2. The method of claim 1 further comprising:
   selecting a clock and data recovery (CDR) voltage controlled oscillator (VCO) having an output frequency matching the cross-referenced optical receive signal frequency;
   converting the optical receive signal to an electrical receive signal;
   frequency-locking the VCO output frequency to the reference clock;
   subsequent to frequency-locking the VCO output frequency, phase-locking the converted optical receive signal, generating a receive data clock; and,
   supplying the converted optical receive signal and receive data clock to the framer interface.

3. The method of claim 1 wherein determining the reference clock signal frequency includes:
   accepting a predetermined time base signal;
   using the time base signal to create a gating signal with a predetermined period; and,
   counting reference clock cycles in the period.

4. The method of claim 2 wherein selecting the CDR VCO includes selecting a VCO from a plurality of VCOs with a corresponding plurality of unique output frequency ranges.

5. The method of claim 4 wherein selecting the VCO from a plurality of VCOs includes selecting a VCO from a plurality of VCOs having overlapping output frequency ranges.

6. The method of claim 1 further comprising:
   receiving an updated reference clock signal;
   determining an updated reference clock signal frequency; and,
   cross-referencing the determined updated clock signal frequency to an updated optical receive signal frequency.

7. The method of claim 1 further comprising:
   cross-referencing the determined reference clock signal frequency to an optical transmit signal frequency;
   selecting a clock synthesizer unit (CSU) VCO having a non-predetermined output frequency matching the cross-referenced optical transmit signal frequency;
   receiving electrical transmit data via the framer interface;

in response to frequency-locking the CSU VCO output frequency to the reference clock signal, generating a-transmit serial clock;

converting the transmit data to an optical transmit signal; and, transmitting the optical transmit signal via the network interface at the rate of the transmit serial clock.

8. The method of claim 7 wherein selecting the CSU VCO includes selecting the VCO from a plurality of VCOs with a corresponding plurality of unique output frequency ranges.

9. In an optical/electrical transceiver, a system for determining an optical signal frequency range, the system comprising:

a clock data recovery (CDR) unit having network interface to accept an optical receive signal having a non-predetermined data rate, a framer interface to accept an electrical reference clock signal having a non-predetermined frequency, and a phase-locked loop (PLL) including a selectable voltage controlled oscillator (VCO) to supply an electrical receive data clock via the framer interface; and, a frequency calculation module having an interface to accept the reference clock signal, the frequency calculation module determining the reference clock signal frequency, cross-referencing the determined clock signal frequency to an optical receive signal frequency, and supplying a VCO selection signal to the CDR PLL.

10. The system of claim 9 wherein the CDR unit includes an optical converter for converting the optical receive signal to an electrical received signal supplied via the framer interface;

wherein the PLL initially frequency-locks to the reference clock signal using the selected VCO, and subsequently phase-locks the optical receive signal, generating the receive data clock.

11. The system of claim 9 wherein the frequency calculation module has a look-up table, a counter, and an interface to accept a predetermined time base signal, the frequency calculation module using the time base signal to gate the counter with a predetermined period, count reference clock cycles in the period, cross-reference the reference clock cycle count to a frequency in the look-up table, and supply the VCO selection signal in response to the look-up table frequency.

12. The system of claim 10 wherein the CDR PLL includes a plurality of VCOs with a corresponding plurality of unique output frequency ranges, selectively engagable in response to the VCO selection signal.

13. The method of claim 12 wherein the VCOs have overlapping output frequency ranges.

14. The system of claim 9 wherein the CDR unit receives an updated reference clock signal; and, wherein the frequency calculation module determines an updated reference clock signal frequency, cross-references the determined updated clock signal frequency to an updated optical receive signal frequency, and supplies an update VCO selection signal.

15. The system of claim 9 further comprising:

a clock synthesizer unit (CSU) having a framer interface to accept electrical-transmit data, a PLL including a selectable VCO with a VCO output frequency frequency-locked to the reference clock and supplied as a transmit serial clock, an electrical converter to convert the electrical transmit data into an optical transmit signal, and a network interface to supply the optical transmit signal at the rate of the transmit serial clock; and, wherein the frequency calculation module supplies a VCO selection signal to the CSU in response to cross-referencing the determined reference clock signal frequency to an optical transmit signal frequency.

16. The system of claim 15 wherein the CSU PLL includes a plurality of VCOs with a corresponding plurality of unique output frequency ranges, selectively engagable in response to the VCO selection signal.

17. In an optical/electrical clock synthesizer unit (CSU), a system for determining an optical transmit signal frequency range, the system comprising:

a clock synthesizer unit (CSU) having a framer interface to accept electrical transmit data, a PLL including a selectable VCO with a VCO output frequency frequency-locked to the reference clock and supplied as a transmit serial clock, an electrical converter to convert the electrical transmit data into an optical transmit signal, and a network interface to supply the optical transmit signal at the rate of the transmit serial clock; and, a frequency calculation module having an interface to accept a reference clock signal, the frequency calculation module determining the reference clock signal frequency, cross-referencing the determined reference clock signal frequency to an optical transmit signal frequency, and supplying a VCO selection signal to the CSU PLL.

* * * * *